April 9, 1963 J. F. MELTON 3,085,216
TEMPERATURE SENSOR
Filed March 1, 1961
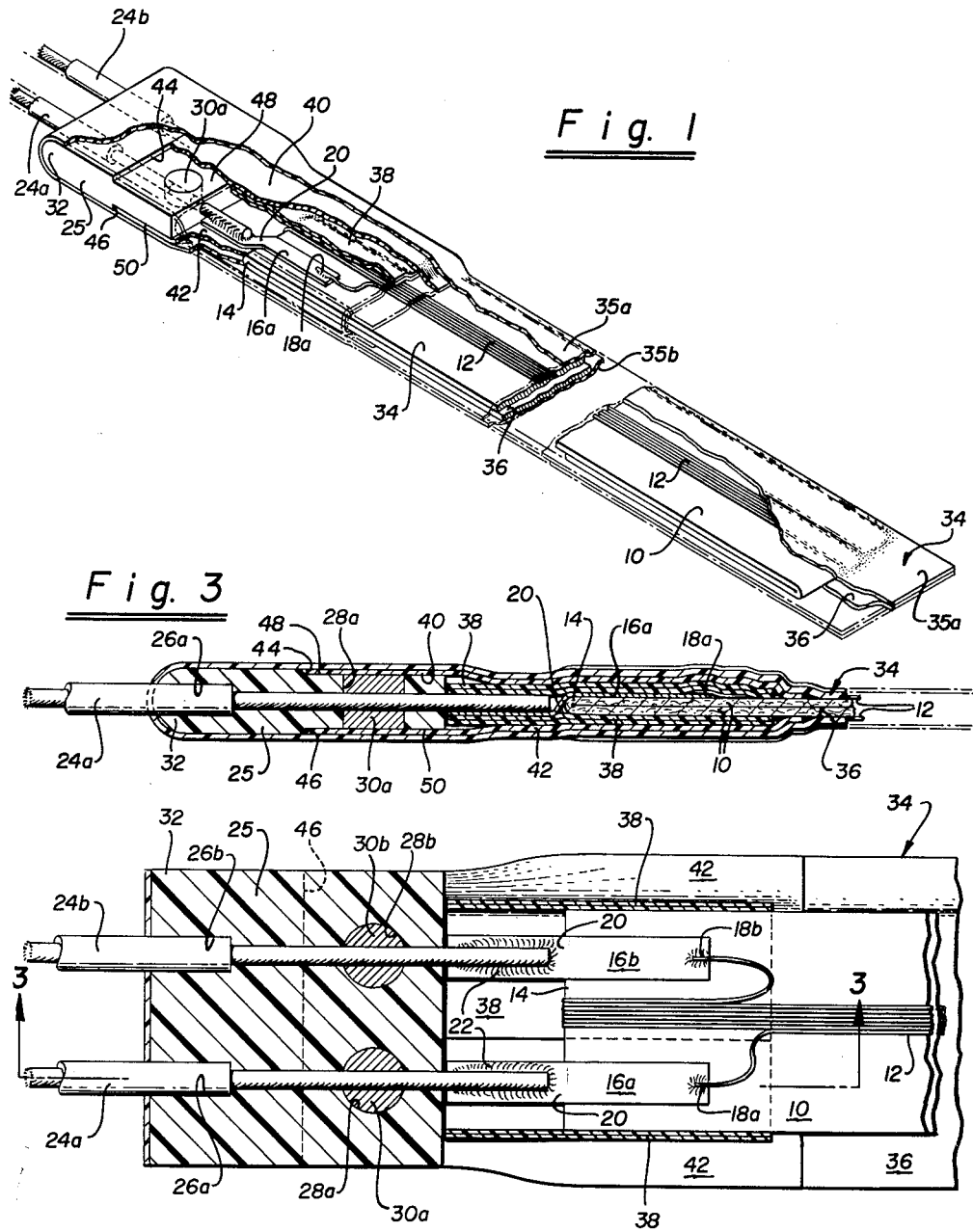
INVENTOR.
James F. Melton
BY

# United States Patent Office 3,085,216
Patented Apr. 9, 1963

3,085,216
TEMPERATURE SENSOR
James F. Melton, Mountain View, Calif., assignor to Alto Scientific Company, Inc., Palo Alto, Calif., a corporation of California
Filed Mar. 1, 1961, Ser. No. 92,681
2 Claims. (Cl. 338—28)

The present invention relates to temperature sensors of the resistance type. Devices of this kind make use of the fact that the resistance of metallic conductors varies with changes in temperature. They comprise usually a coil of a high resistance wire that forms part of an electric circuit, and as the temperature around the coil varies and its resistance changes as a result thereof, the flow of current in the circuit varies accordingly. These changes in current flow are representative of changes in the ambient temperature and may be measured in suitable meters or may be employed to control devices that set compensatory apparatus into motion or which transmit information concerning temperature changes to remotely located observation posts.

The high resistance wire employed in the coils of temperature sensors is usually very thin as compared with the wires that lead to, and form part of, the resistance-change sensing and indicating circuitry. This presents the problem of establishing a dependable, electrically conductive connection between the ends of the temperature-sensitive coil and the leads of the resistance-change sensing circuitry. It is most important that this connection be not impaired during practical use of the sensor when it may be subjected to severe strains. For instance, when temperature sensors are employed in missiles this connection may be exposed to considerable strains due to rapid acceleration of the missiles and to shocks to which the missiles may be subjected.

It is an object of the present invention to provide a temperature sensor of the resistance type, that is of simple, dependable and compact construction.

More particularly, it is an object of the invention to provide, in temperature sensors of the type referred to, a dependable connection between the circuit leads and the ends of the high resistance coil.

Still another object of the invention is to provide a resistance type temperature sensor wherein both, the temperature sensing coil and the leads of the sensing circuit, may be subjected to appreciable tension without danger that the connection between them may break or its conductivity be impaired.

These and other objects of the present invention will be apparent from the following description of the accompanying drawing which illustrates a preferred embodiment thereof and wherein FIGURE 1 is an enlarged fragmentary perspective of a temperature sensor embodying my invention, with parts thereof broken away to expose structure underneath;

FIGURE 2 is a horizontal section through a portion of the sensor illustrated in FIGURE 1, and FIGURE 3 is a vertical section taken along line 3—3 of FIGURE 2.

Having first reference to FIGURE 1, the temperature-sensing high resistance coil comprises a flat, elongated-rectangular coil form 10 which may be formed by a flattened-out annular band of a suitable insulating material, such as the substance known under the trade name Mylar. Upon said coil form is wound a winding 12 consisting of many convolutions of hair wire. Adjacent one end of the flattened coil form two flat metal strips or fillets 16a and 16b are suitably secured to said form and project beyond the narrow edge 14 thereof. The ends of the winding 12 are spot-welded to said metal strips as indicated at 18a and 18b so that said strips form in fact the terminals of the winding. The strips 16a and 16b may contain an S-bend as indicated at 20 in FIGURES 1, 2 and 3 and soldered to the upper surfaces of the lower portions of said strips, as shown at 22, are the ends of the circuit leads 24a and 24b which are of substantially greater thickness than the wire of coil 12.

To make it impossible for any pull upon the leads 24a and 24b or the coil form 10 to tear the leads and the terminals 16a and 16b apart and thus break the mechanical and electrical connection established by the solder 22, the leads 24a and 24b are anchored in a flat block 25 of insulating material. For this purpose they extend through horizontal bores 26a and 26b provided in the block 25, and said block contains also a pair of vertically extending bores 28a and 28b that intersect the bores 26a and 26b, respectively; and during assembly of the device, after the ends of the leads 24a and 24b have been denuded of insulation and have been pushed through the horizontal bores 26 until their free ends project from the block 25, a suitable solder is poured into the vertical bores 28a and 28b. Upon solidification this solder forms plugs 30a and 30b, respectively, that cling to the leads 24a and 24b and fill the vertical bores 28a and 28b and thus make it impossible for said leads to be withdrawn from, or even be shifted, relative to the anchoring block 25.

With the leads thus safely anchored in the block 25, and the projecting ends thereof soldered to the metal terminals 16a and 16b, means are provided to prevent the block 25, and hence the leads 24a and 24b, from being pulled away from the coil form 10. For this purpose the end of the block opposite to where the ends of the leads project, is smoothly rounded as shown at 32, and a band 34 of a strong tape of insulating material and of the type having a tacky inner surface 36 is looped around said curved end 32 of block 25, as shown in FIGURE 1, and its end or shank portions 35a and 35b are brought over the top and bottom surfaces of said block 25 and into contact with the top and bottom surfaces of the coil form 10 and the convolutions of wire wound thereon. Said band 34 may be of sufficient width and length for its shank portions to cover the opposite sides of the flattened coil form 10 over the total width and length thereof, and to extend beyond the remote end of said coil form into contact with each other, as likewise shown in FIGURE 1.

When the shank portions of the band 34 are pressed down upon the opposite sides of the coil form 10, the tacky inner surfaces thereof adhere firmly to said form, and the band therefore does not only form an envelope for the high resistance winding, and the anchor block, it also makes it impossible for any force exerted upon the leads 24a, 24b to tear them apart from the terminals 16a, 16b on coil form 10, because any force exerted upon the leads is transmitted to the anchoring block 25 through the plugs 30a and 30b, and from said block 25 through the shank portions of the band 34 directly to the coil form 10, and therefore tends to move the coil form in the same direction without exerting any stress or strain upon the connection between the lead ends 24a, 24b and the terminals 16a and 16b, respectively; and vice versa, any pull exerted upon the remote end of the coil form 10, or the remote ends of the shank portions of the band 34, is transmitted directly to the anchoring block 25, and through the plugs 30a and 30b to the leads 24a and 24b, without involving the vulnerable solder connection between the lead ends and the terminals 16a and 16b. Hence, the sturdy tape 34 or the anchoring plugs 30 must break before the connection between the lead ends and the terminals can be impaired. In practice I have found that a tape known under the trade name Mylar has performed very well.

For additional protection of the delicate connection between the leads 24a, 24b and the terminals 16a, 16b respectively and appropriate insulation thereof, a short length of an insulating tape of the same kind as tape 34 may be looped transversely about the lead ends, the terminals 16a, 16b and the near end of the coil form 10, as indicated at 38, and sheets of glass fibres embedded in a suitable insulating resin such as the plastic known as Epoxy resin may be placed above the upper, and below the lower, leg of the loop 38, as shown at 40 and 42. To locate said sheets appropriately, the upper and lower surfaces of the anchoring block 25 may be recessed to provide shoulders 44 and 46, respectively, against which the edges of said sheets may bear, and to provide depressed surfaces 48 and 50 upon which they may rest, as shown in both FIGURES 1 and 3.

While I have explained my invention with the aid of an exemplary embodiment thereof, it will be understood that the invention is not limited to the specific constructional details shown and described by way of example which may be departed from without departing from the scope and spirit of the invention.

I claim:

1. A temperature sensor comprising a flat coil form, a winding wound upon said coil and having a pair of terminals, a block of insulating material located adjacent said terminals, said block having a first pair of bores extending from its side adjacent to said terminals to the opposie side thereof, and a second pair of bores extending at an angle to and intersecting said first pair of bores, lead wires extending through said first bores into conductive contact with said terminals, plugs of soldering metal in said second bores surrounding said wires at the intersection of said first and second bores to anchor said wires in said block, a tape of insulating material wound around said block from the side thereof remote from said terminals and having shank portions extending into contact with said coil form, and means adhesively securing said tape to said anchoring block and said coil form.

2. A temperature sensor comprising a flat elongated coil form, a winding wound upon said coil form and having a pair of terminals, a block of insulating material located adjacent said terminals, said block having a first pair of bores extending from its side adjacent to said terminals to the opposite side thereof, and a second pair of bores extending at right angles to and intersecting said first pair of bores, lead wires extending through said first bores into conductive contact with said terminals, plugs or soldering metal in said second bores surrounding said wires at the intersection of said first and second bores to anchor said wires in said block, a tape of insulating material wound around said block from the side thereof remote from said terminals and having shank portions extending into contact with the surfaces of said coil form, and means adhesively securing said tape to said anchoring block and said coil form.

References Cited in the file of this patent

UNITED STATES PATENTS

| | | |
|---|---|---|
| 2,450,263 | Wise | Sept. 28, 1948 |
| 2,952,001 | Morey | Sept. 6, 1960 |